United States Patent [19]

Mui

[11] Patent Number: 5,432,819
[45] Date of Patent: Jul. 11, 1995

[54] DPSK COMMUNICATIONS WITH DOPPLER COMPENSATION

[75] Inventor: Shou Y. Mui, Cherry Hill, N.J.

[73] Assignee: Martin Marietta Corporation, Camden, N.J.

[21] Appl. No.: 208,321

[22] Filed: Mar. 9, 1994

[51] Int. Cl.⁶ ............................................. H04L 27/22
[52] U.S. Cl. .................................. 375/329; 375/330; 375/344; 329/306
[58] Field of Search ....................... 375/52, 56, 83, 84, 375/85, 86, 81, 97, 52; 329/304, 307, 306; 455/257, 238.260

[56] References Cited

U.S. PATENT DOCUMENTS

| | | | |
|---|---|---|---|
| 4,879,728 | 11/1989 | Tarallo | 375/84 |
| 4,947,409 | 8/1990 | Raith et al. | 375/97 |
| 5,012,491 | 4/1991 | Iwasaki | 375/97 |
| 5,157,694 | 10/1992 | Iwasaki et al. | 375/85 |

Primary Examiner—Stephen Chin
Assistant Examiner—Tesfaldet Bocure
Attorney, Agent, or Firm—W. H. Meise; G. H. Krauss; S. A. Young

[57] ABSTRACT

A data receiver receives differential phase-shift keyed (DPSK) signals, and filters the signal by a process including frequency conversion, under the control of an estimated carrier frequency ($f_{re}$), to produce a filtered output signal which is applied to a DPSK demodulator. The filtering compensates for the Doppler frequency errors, and reduces the phase error. The estimated frequency is determined by second and third controllable filters, which filter the DPSK carrier signal at frequencies above and below the estimated carrier frequency by an offset frequency which depends on the data rate. A first frequency error estimate is made in a processor coupled to the second and third filters, from the ratio of the amplitudes of the first and second filter output signals. A second-order tracking loop is coupled to the processor for averaging the frequency error estimate over a predetermined number of bits, to generate the estimate of the carrier frequency. The Doppler frequency compensation loop tends to correct the phase error, but may leave residual phase errors. In an embodiment of the invention, an estimate of the phase change per bit is generated by a differential phase tracker coupled to the output of the first filter, and applied to the demodulator, in which it is used to aid in demodulation. The estimate of the phase change per bit may also be applied to the Doppler frequency compensation loop for aiding in the Doppler frequency compensation.

14 Claims, 8 Drawing Sheets

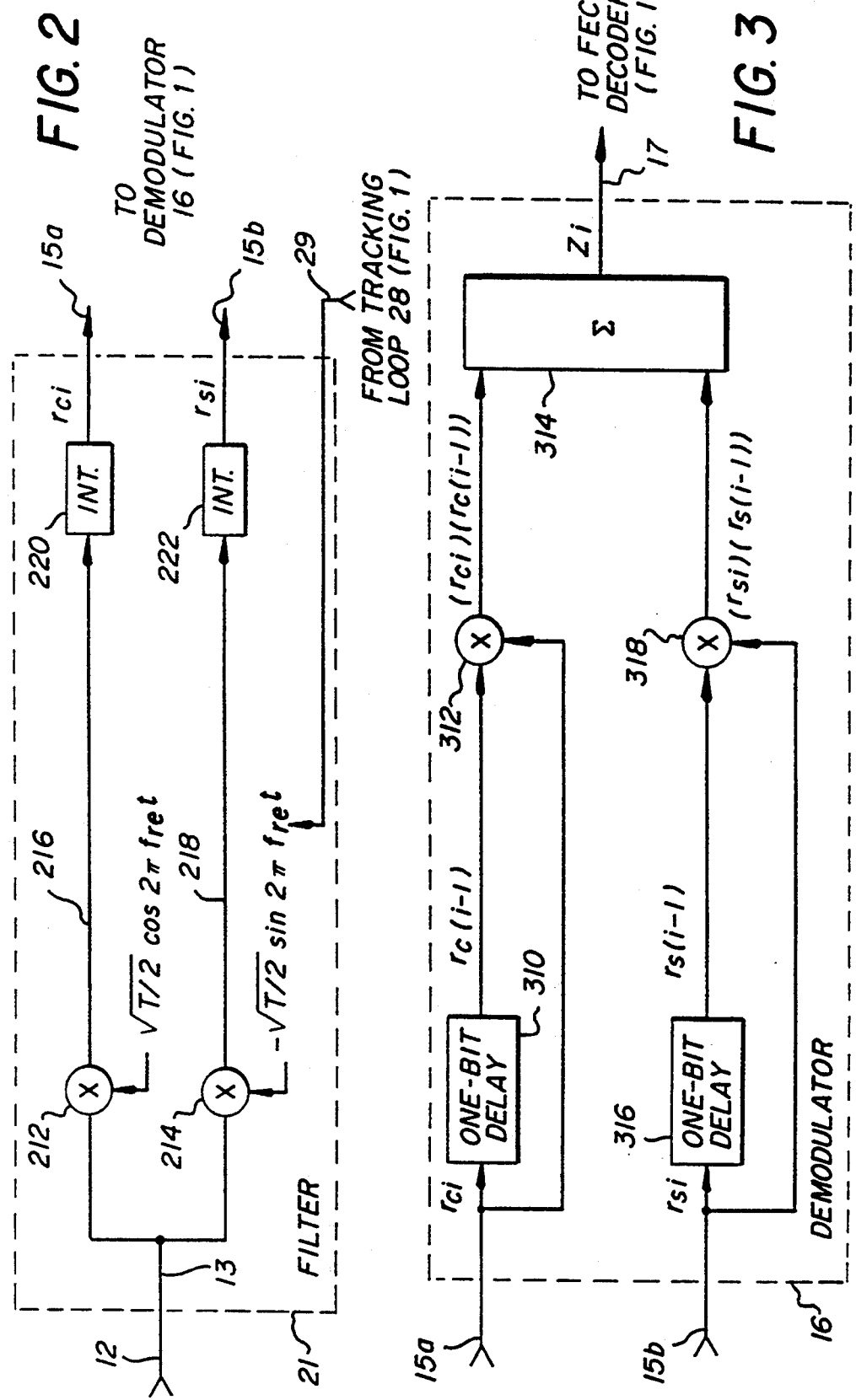

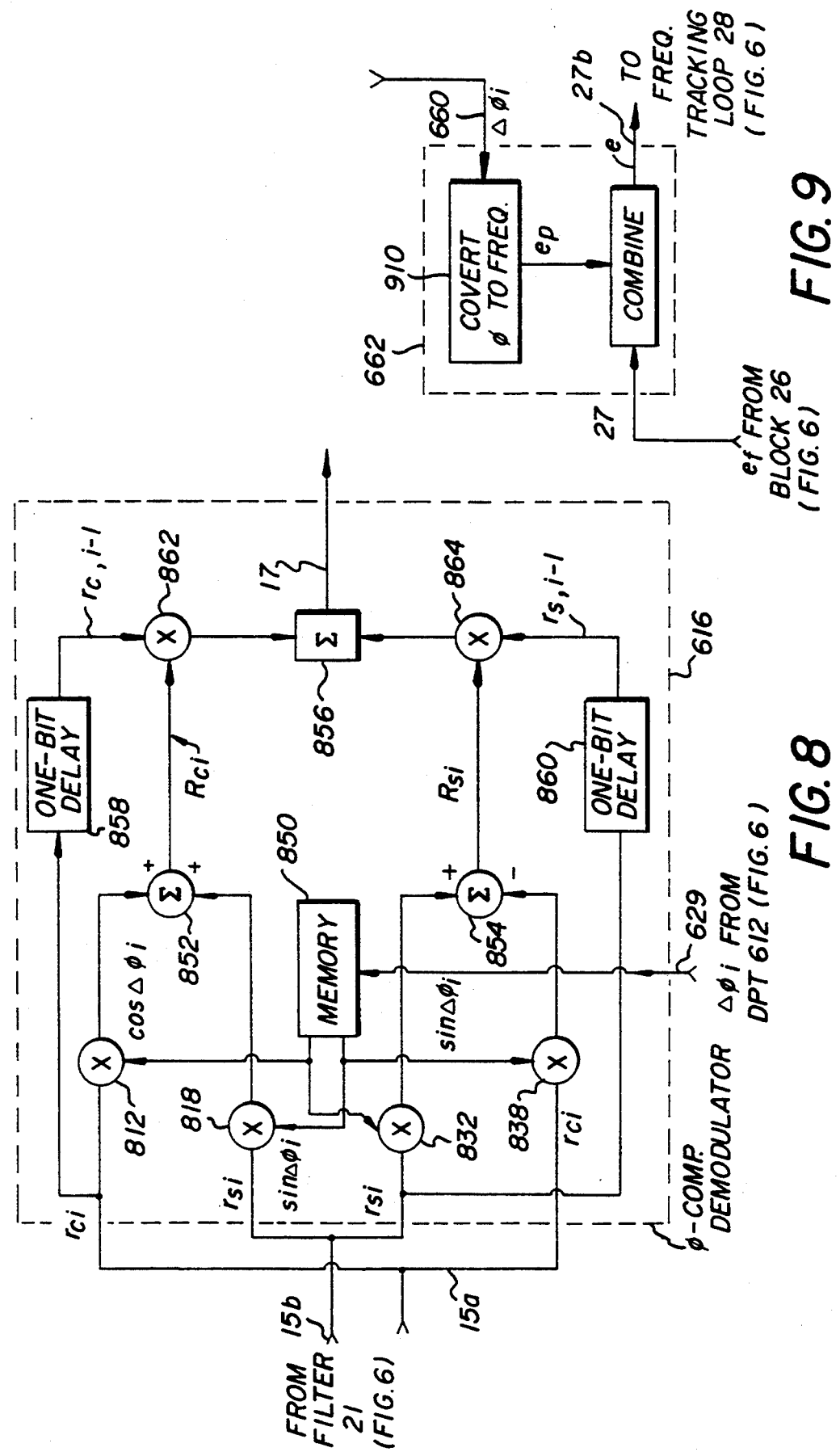

DPSK COMMUNICATIONS WITH DOPPLER COMPENSATION

This invention relates to differential DPSK communications, and more particularly to compensation of such signals for Doppler variations.

BACKGROUND OF THE INVENTION

The carrier frequency of a received signal in communications systems may vary with time. Sources of frequency variations include drifts of the frequency standards and relative motion between the transmitter and receiver. Consider, as an example, a satellite terminal mounted on a ship. As the ship rolls, pitches, yaws and heaves, the received signal frequency changes, generally in a sinusoidal fashion. The amount of frequency variation is proportional to the carrier frequency. For SHF satellite communications (7-8 GHz) in the presence of rough waters, or, high sea states, the frequency could change by hundreds of Hz in a few seconds. For example, the AS-3399/WSC antenna of the U.S. Navy's AN/WSC-6 SHF SATCOM terminal is designed for sinusoidal ship motion with an amplitude of 35° and a period of 7 seconds. If the antenna is mounted at a height of 30 feet from the center of motion, the maximum Doppler at 8 GHz is about 300 Hz.

Differential phase-shift keyed (DPSK) modulation modulates or encodes a logic 0 bit as a continuation of the carrier phase representing the previous bit, and modulates a logic 1 level as a phase reversal from the carrier phase representing the previous bit. The presence of Doppler shifts introduces phase variations which tend to make DPSK demodulation or decoding more noisy. Current ship-mounted SHF satellite terminals employ a special-purpose receiver to process a beacon signal transmitted by the satellite. The received beacon signal is used to track the change in frequency attributable to the Doppler shift. The detected frequency shift is fed to the communications receiver, which compensates for the frequency change. Recently, there has been interest in low cost terminals capable of supporting communications without using a beacon receiver. Without a beacon receiver, the communications receiver must track frequency using the data signal.

Modern communications systems employ forward error-correction (FEC) coding to reduce the signal-to-noise ratio (SNR) needed to support communications. Such systems typically need a SNR per bit of only four to eight dB to achieve satisfactory performance, which is usually defined as a bit error rate (BER) of $10^{-5}$. Operation at a lower SNR, made possible by the use of coding, makes frequency tracking more difficult.

The drive for lower cost terminals has also led to smaller antennas, which transduce less signal. As a result, the data rate that can be supported is smaller. The lowest useful data rate may be, for example, 75 b/s. Low rate communications in the presence of rapidly-varying Doppler is difficult because the carrier-to-noise ratio, which is the product of the data rate and the SNR per data bit, is smaller at smaller data rates, which tends to result in larger frequency tracking errors. Furthermore, the lower data rate requires a more accurate frequency estimate since the bit duration, and therefore the integration time, is longer.

SUMMARY OF THE INVENTION

A data receiver receives differential phase-shift keyed (DPSK) signals, and controllably filters the signal by a process including frequency conversion, under the control of an estimated carrier frequency ($f_{re}$), to produce a filtered output signal which may be applied to a demodulator. The filtering tends to compensate for the frequency errors caused by the Doppler, thereby reducing the phase drift or error. In one embodiment of the invention, the estimated frequency is determined by second and third controllable filters, to which the DPSK signals are applied, which filter at frequencies above and below the estimated carrier frequency, respectively, by an offset frequency which is inversely proportional to the data bit duration. A first frequency error estimate is made in a processor coupled to the second and third filters, in response to the amplitudes of the second and third filter output signals. A second-order tracking loop is coupled to the processor for averaging the first frequency error estimate over a predetermined number of bits, to generate the estimate of the nominal carrier frequency for the first, second and third filters. The Doppler frequency compensation loop tends to reduce the phase drift.

The Doppler frequency compensation loop may not correct for all the Doppler shift and, as a result, there is a residual phase drift. In a particular embodiment of the invention, an estimate of the phase change per bit is generated by a differential phase tracker coupled to the output of the first filter, and the estimate of the phase change is applied to the demodulator, in which the estimate of the phase change per bit is used to aid in demodulation, to thereby achieve improved BER. At moderate and high signal-to-noise ratios, the estimate of the phase change per bit may also be applied to the Doppler frequency compensation loop for aiding in the Doppler frequency compensation.

DESCRIPTION OF THE DRAWING

FIG. 2 is a simplified block diagram of a controllable filter of FIG. 1;

FIG. 3 is a simplified block diagram of the DPSK demodulator of FIG. 1;

FIG. 8 is a simplified block diagram of a DPSK demodulator which may be used in the arrangement of FIG. 6, which makes use of the differential phase tracker information to aid in demodulation;

FIG. 9 is a simplified block diagram of an arrangement for using the phase information produced by the differential phase tracker of FIG. 7 to aid in estimating the carrier frequency;

DESCRIPTION OF THE INVENTION

Figure 1:
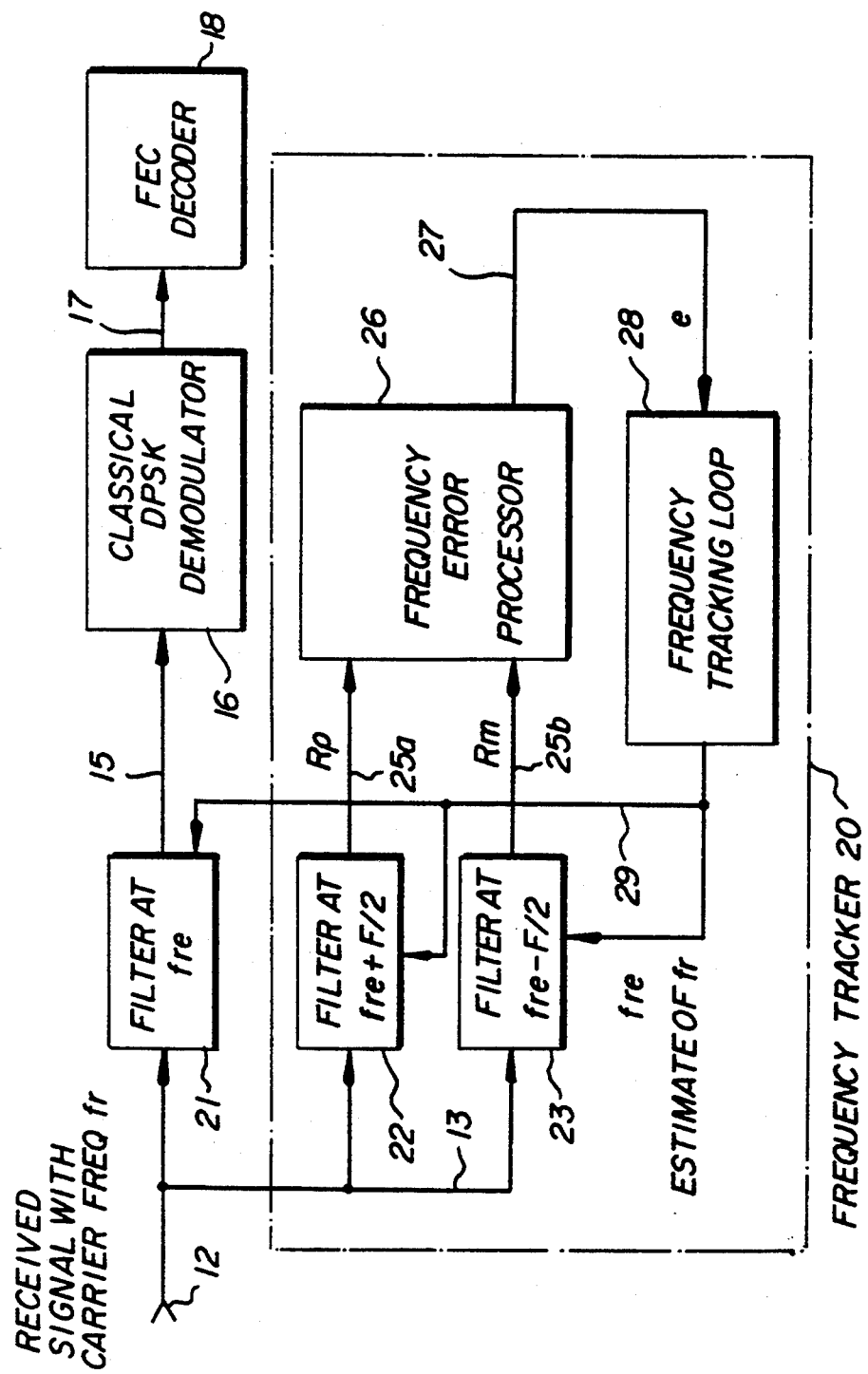
FIG. 1 is a simplified block diagram of a DPSK receiver according to the invention, for controllably filtering a received DPSK signal, and for applying the filtered signal to a demodulator and forward-error-correction (FEC) decoder.

In FIG. 1, a differential phase-shift key modulated (DPSK) carrier is applied to an input port 12 of a receiver 10. The actual carrier frequency is $f_r$. The received signal may have been downconverted to frequency $f_r$ from another frequency before application to input port 12. The DPSK carrier is applied from input port 12 by a path 13 to a controllable filter 21, which filters the DPSK carrier at a frequency $f_{re}$, which is controllable under the influence of a control signal applied over a signal or data path 29, to produce a filtered received signal on a signal path 15, as described below in conjunction with FIG. 2. The filtered received signal is applied over a signal path 15 to a conventional or classical DPSK demodulator 16, illustrated in more detail in FIG. 3, which demodulates the signal. If the data is encoded with forward error correction (FEC), the demodulated data from demodulator 16 is applied over a path 17 to an FEC decoder 18.

The frequency $f_{re}$ of filter 21 of FIG. 1 is controlled by a frequency tracker designated 20, which produces an estimate $f_{re}$ of the received carrier nominal frequency $f_r$, which estimate, as mentioned, is applied to filter 21 over a data path 29. Frequency tracker 20 includes second and third filters 22 and 23, respectively, which are coupled by signal path 13 to input port 12 to receive the DPSK signal, and which filter the signal at frequencies of $f_{re} + (F/2)$ and $f_{re} - (F/2)$, respectively, where F is the instantaneous channel bit rate of the received DPSK signal, known a priori to receiver 10. Filter 22 produces, on a data path 25a, an output signal designated $R_p$, which represents the magnitude of the filtered signal component. Filter 23 similarly produces, on a data path 25b, an output signal $R_m$, which represents the magnitude of the output of filter 23 in response to the signal applied to input port 12 with carrier frequency $f_r$. A processor represented as a block 26 determines e, the estimated frequency error between actual carrier frequency $f_r$ and the estimated carrier frequency $f_{re}$. Frequency error estimate e is applied to a frequency tracking loop 28, which is preferably a second-order loop, described in more detail below in conjunction with FIG. 10, which averages error estimate e over a predetermined number of bits of the received DPSK signal, to produce the estimated DPSK carrier frequency $f_{re}$. The current estimated DPSK carrier frequency $f_{re}$ is applied from frequency tracking loop 28 to filters 21, 22 and 23 for control of the filter frequencies.

FIG. 2 is a simplified block diagram of filter 21 of FIG. 1. In FIG. 2, the received signal at frequency $f_r$ is applied, from signal path 13, in common to first and second multipliers 212, 214, for multiplication by $\sqrt{(T/2)} \cos 2\pi f_{re} t$ and $\sqrt{(T/2)} \sin 2\pi f_{re} t$, respectively, where the multipliers are controlled by the frequency estimate signals applied over data path 29. Since the estimated frequency $f_{re}$ changes from bit to bit of the received signal to track the input frequency, the frequency of the signal at the outputs of multipliers 212 and 214 should, in principle, be invariant, except for frequency changes occurring during the bit interval. The multiplied or frequency-converted signals are applied from multipliers 212 and 214 over paths 216 and 218, respectively, to integrators 220 and 222, respectively, in which the signals are accumulated to produce filtered received signals designated $r_{ci}$ and $r_{si}$, respectively, where the subscript i refers to the currently received bit. Signals $r_{ci}$ and $r_{si}$ are the in-phase and quadrature components of the received signal, and may be represented by $$r_{ci} = \int_{(i-1)T}^{iT} r(t) \sqrt{2/T} \cos 2\pi (f_{re} + bF) t \, dt \quad (1)$$

$$r_{si} = -\int_{(i-1)T}^{iT} r(t) \sqrt{2/T} \sin 2\pi (f_{re} + bF) t \, dt \quad (2)$$

where F is the instantaneous channel bit rate, $1/T$, where T is the bit duration; $f_r$ is the current carrier frequency; $f_{re}$ is the current estimate of $f_r$; and $b=0$ for filter 21, centered at $f_{re}$.

FIG. 3 is a simplified block diagram of demodulator 16 of FIG. 1. In FIG. 3, signal paths 15a and 15b are portions of path 15 of FIG. 1. In FIG. 3, filtered received signals $r_{ci}$ are applied from signal path 15a, in common, to the inputs of a multiplier 312 and of a one-bit-delay (that is, a delay equal to T, which is one bit of the received signal, as opposed to one bit of the processing in the receiver) delay line or delay 310. As known to those skilled in the art, the term "delay line" or "delay" encompasses any of various delay arrangements, one common version of which is a shift register. The one-bit delayed output signal from delay 310 may be represented as $r_{c(i-1)}$, which is applied to a second input port of multiplier 312. Multiplier 312 multiplies the current and delayed signals together, to produce a multiplied signal $(r_{ci})(r_{c(i-1)})$, which is applied to an input port of a summing ($\Sigma$) circuit 314. Similarly, signal $r_{si}$ is applied from signal path 15b in common to the inputs of a multiplier 318 and of a one-bit-delay 316. The delayed output signal from delay 316 may be represented as $r_{s(i-1)}$, which is applied to a second input port of multiplier 318. Multiplier 318 multiplies the current and delayed signals together, to a produce a multiplied signal $(r_{si})(r_{s(i-1)})$, which is applied to an input port of summing circuit 314. Summing circuit 314 produces the demodulated output signal $$Z_i = (r_{ci})(r_{c(i-1)}) + (r_{si})(r_{s(i-1)}) \quad (3)$$

The demodulated output signal is produced on signal path 17, from which it is applied, if desired, to forward error correction processing block 18 of FIG. 1. If forward-error-correction coding is not used, the FEC processing block of FIG. 1 would be replaced by a processor which announces either a bit 0 or 1 as the $i^{th}$ transmitted bit, depending upon the polarity of the demodulated output signal $Z_i$. Specifically, if $Z_i > 0$, there has been no phase reversal, and a logic 0 bit is announced, and if $Z_i < 0$, there has been a phase reversal, and a logic 1 bit is announced.

Figures 4, 5:
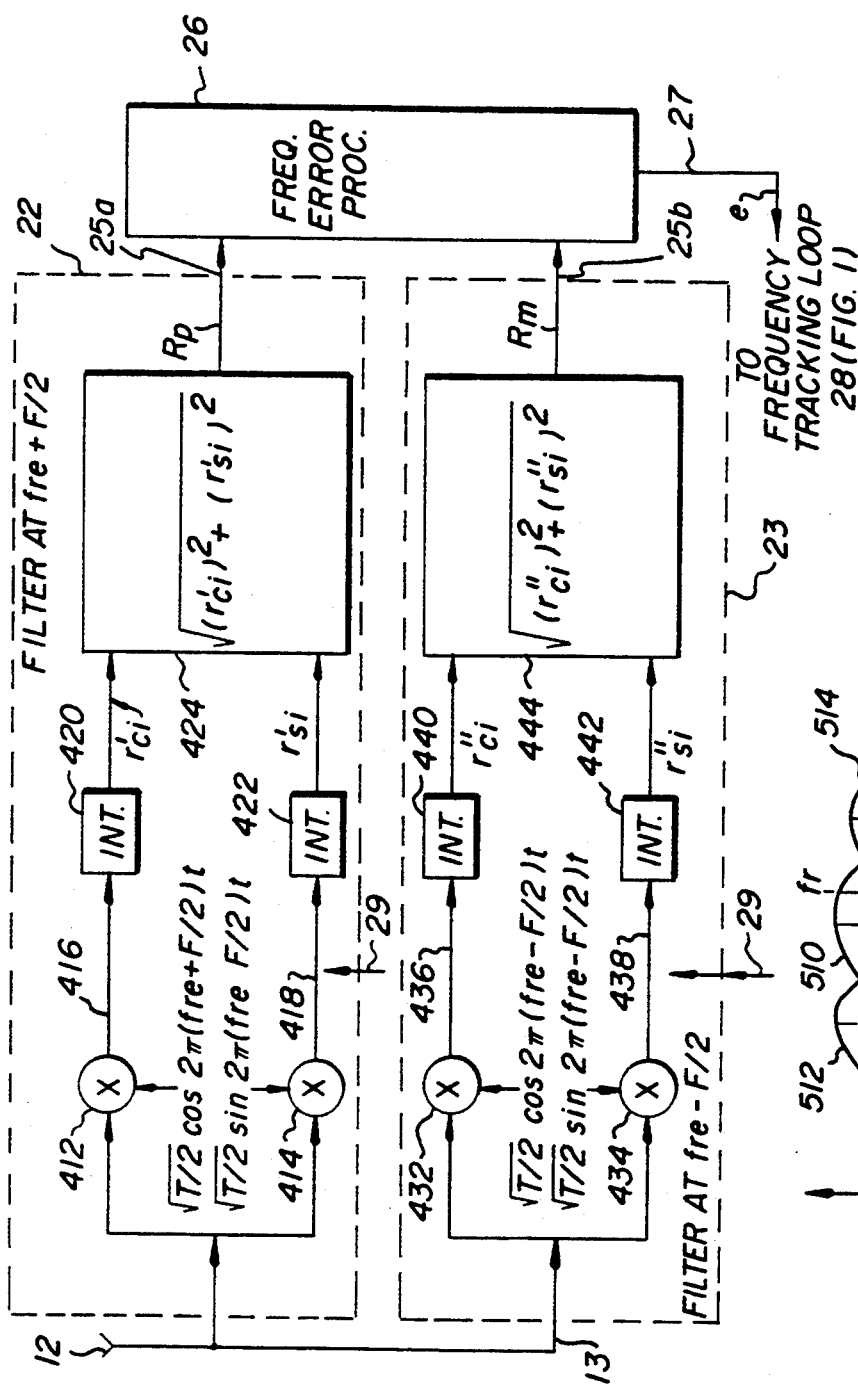
FIG. 4 is a simplified block diagram of frequency error filters and a frequency estimator portion of FIG. 1.
FIG. 5 plots amplitude versus frequency response for the filters of FIG. 1.

FIG. 4 is a simplified block diagram of a portion of frequency tracker 20 of FIG. 1. In FIG. 4, received signal at frequency $f_r$ is applied from signal path 13 to filters 22 and 23, which are similar, in part, to filter 21, described above in conjunction with FIG. 2. More particularly, the received signal at frequency $f_r$ is applied in common to first and second multipliers 412, 414, for multiplication by $\sqrt{(T/2)} \cos 2\pi(f_{re}+F/2)t$ and $-\sqrt{(T/2)} \sin 2\pi(f_{re}+F/2)t$, respectively, where the multipliers are controlled by the signals applied over data path 29. The multiplied signals from multipliers 412 and 414 are applied over data paths 416 and 418, respectively, to integrators 420 and 422, respectively. The integrated or accumulated signals from integrators 420 and 422 are designated $r'_{ci}$ and $r'_{si}$, respectively, and are applied to the inputs of an amplitude determining block 424. Amplitude determining block 424 determines the amplitude of the signal represented by its input signals by taking the square root of the sum of the squares of the input signals, to thereby produce an amplitude-representative signal $R_P$ on its output signal path 25a;

$$R_p = \sqrt{(r_{ci}')^2 + (r_{si}')^2} \tag{4}$$

Similarly, the received signal at frequency $f_r$ is applied from signal path 13 in common to first and second multipliers 432, 434, of filter 23 for multiplication by $\sqrt{(T/2)} \cos 2\pi(f_{re}-F/2)t$ and $-\sqrt{(T/2)} \sin 2\pi(f_{re}-F/2)t$, respectively, where the multipliers are controlled by the signals applied over data path 29. The multiplied signals from multipliers 432 and 434 are applied over data paths 436 and 438, respectively, to integrators 440 and 442, respectively. The integrated signals from integrators 440 and 442 are designated $r''_{ci}$ and $r''_{si}$, respectively, and are applied to the inputs of an amplitude determining block 444. Amplitude determining block 444 determines the amplitude of the signal represented by its input signals by taking the square root of the sum of the squares of the input signals, to thereby produce an amplitude-representative signal $R_m$ on its output signal path 25b;

$$R_m = \sqrt{(r_{ci}'')^2 + (r_{si}'')^2} \tag{5}$$

Since the estimated frequency $f_{re}$ which is applied as a control input to filters 22 and 23 of FIG. 4 changes from bit to bit of the received signal to track the input frequency, the signals at the outputs of filters 22 and 23 should, in principle, continuously lie at the same relative location on the filter responses, and therefore their relative amplitudes should be equal regardless of the variation in the input frequency. Referring to FIG. 5, plot 510, representing the frequency response of filter 21 of FIG. 1, is centered at estimated carrier frequency $f_{re}$. Plot 512, representing the frequency response of filter 23, is similar to plot 510, but is centered at frequency $f_{re}-F/2$. Plot 514, representing the frequency response of filter 22, is centered at frequency $f_{re}+F/2$. These offset frequencies correspond to values of b equal to $+\frac{1}{2}$ and $-\frac{1}{2}$ in equations (1) and (2). Since plots 510, 512 and 514 are similar and are equally spaced, the responses of filters 22 and 23 will be equal if the received carrier frequency $f_r$ is actually at the estimated carrier frequency $f_{re}$. However, if the received carrier frequency deviates from the estimated carrier frequency, filters 22 and 23 will respond with different amplitudes. For example, if the received carrier frequency $f_r$ is offset higher than $f_{re}$, as illustrated in FIG. 5, filter 22 response 514 will produce a relatively large-amplitude signal, illustrated by level 516, by comparison with the level 518 which filter 23 response 512 provides. Thus, the amplitude responses of filters 22 and 23 may be used to control the filter frequencies to maintain the filters centered on the received signal frequency.

The values of $R_p$ and $R_m$ in FIG. 4 are applied to an error signal generator or frequency error processor block 26, which determines, for each bit, a maximum value of ratio $\gamma$ according to $$\gamma = \text{MAX}\left\{ \frac{R_m}{R_p}, \frac{R_p}{R_m} \right\} \tag{6}$$

The output of processor block 26 is the one-bit or first-try estimate e of the frequency error $$e = \left( \frac{1}{2} - \frac{\gamma}{1+\gamma} \right) F \text{ if } R_m \geq R_p \tag{7}$$

$$e = \left( \frac{\gamma}{1+\gamma} - \frac{1}{2} \right) F \text{ if } R_m < R_p \tag{8}$$

The value of e determined according to equations (7) or (8) is an unbiased estimate of the frequency error, meaning that it is not subject to bias due to the effects of the polarities of adjacent bits.

Figure 6:
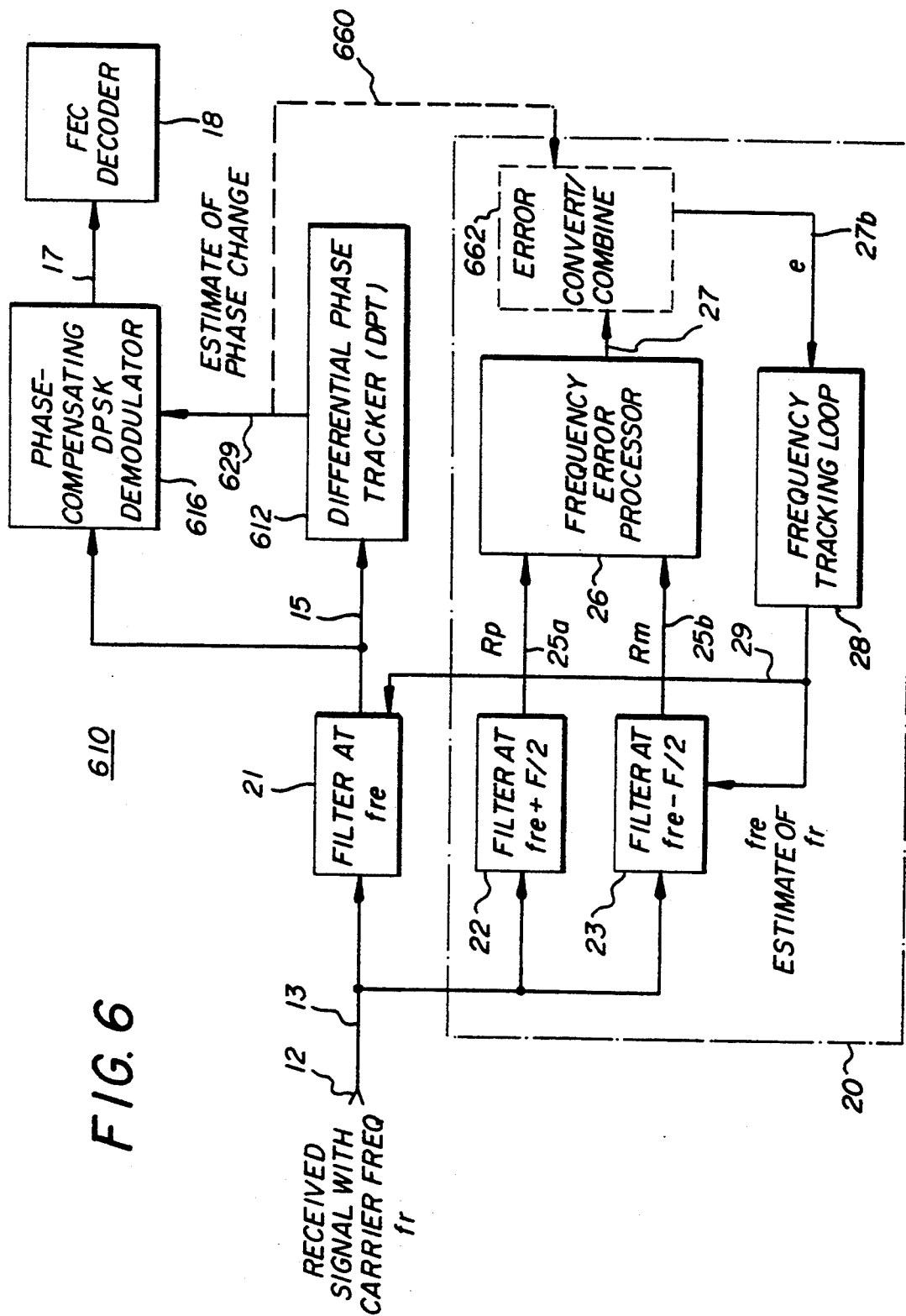
FIG. 6 is a simplified block diagram of a system similar to that of FIG. 1, in which a differential phase tracker produces an estimate of the phase change per bit, and the estimate is used to aid in demodulation.

DPSK receiver 610 of FIG. 6 is generally similar to receiver 10 of FIG. 1, and corresponding elements are designated by like reference numerals. The arrangement of FIG. 6 differs from the arrangement of FIG. 1 in that it additionally includes a differential phase tracker 612 coupled to receive the filtered received signal from filter 21. Differential phase tracker 612 determines the bit-to-bit phase difference in the filtered received signal from filter 21, and applies the signal over a signal path 629 to a phase compensating DPSK demodulator, designated 616 to distinguish it from demodulator 16 of FIG. 1.

Figure 7:
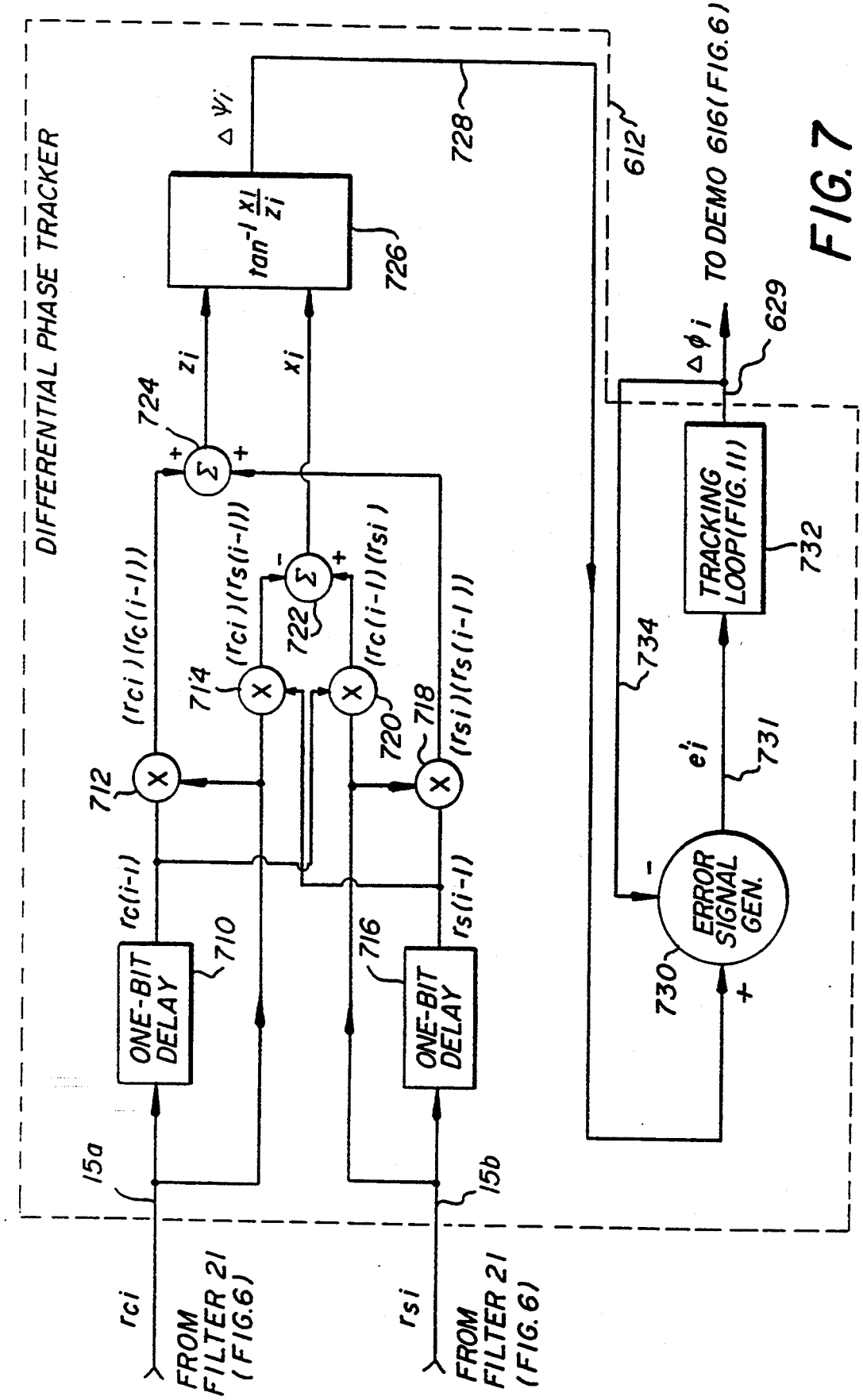
FIG. 7 is a simplified block diagram of a differential phase tracker which may be used in the arrangement of FIG. 6.

FIG. 7 is a simplified block diagram of differential phase tracker 612 of FIG. 6. In FIG. 7, differential phase tracker 612 receives signal $r_{ci}$ from filter 21 over signal path 15a, and receives signal $r_{ci}$ over signal path 15b. Signal $r_{ci}$ is applied from path 15a to the input ports of a one-bit delay 710, a multiplier 712, and a further multiplier 714. Similarly, signal $r_{si}$ is applied from signal path 15b to the input ports of a one-bit delay 716, a multiplier 718 and a further multiplier 720. The delayed signals $r_{c(i-1)}$ from delay 710 are applied to input ports of multipliers 712 and 720, and the delayed signals $r_{s(i-1)}$ from delay 716 are applied to inputs of multipliers 714 and 718. The multiplied output signal from multiplier 714 is $(r_{ci})(r_{s(i-1)})$, and the multiplied output signal from multiplier 720 is $(r_{c(i-1)})(r_{si})$, which multiplied signals are summed together in a summing circuit 722 to form a signal designated $x_i$, $$x_i = -(r_{c,i}r_{s,i-1}) + (r_{c,i-1}r_{si}) \tag{9}$$

and the multiplied output signals $(r_{ci})(r_{c(i-1)})$ and $(r_{si})(r_{s(i-1)})$ from multipliers 712 and 718, respectively, are summed together in a summing circuit 724 to form an output signal designated $z_i$, $$z_i = (r_{c,i-1}r_{ci}) + (r_{s,i-1}r_{si}) \tag{10}$$

Signals $z_i$ and $x_i$ are applied to a block illustrated as 726, which represents the determination of the angle whose tangent is $x_i/z_i$, which angle is the desired phase offset $\Delta\Psi_i$, $$\Delta\Psi_i = \tan^{-1}\frac{x_i}{z_i} \quad (11)$$

which is a "one-shot", unbiased estimate.

The angle information is applied from angle determining block 726 over a signal path 728 to an error signal generator block 730. Block 730 processes the signal by generating an error signal $e_i$ for the $i^{th}$ bit $$e_i = \Delta\Psi_i - \Delta\phi_i \quad (12)$$

where $\Delta\Phi_i$ is the output of the differential phase tracker, applied by way of a feedback path 734. The error is limited $$e_i' = \begin{matrix} e_i & \text{if } e_i < \lambda \\ \lambda & \text{otherwise} \end{matrix} \quad (13)$$

where $\lambda$ is a preselected limit.

The error signal $e'_i$ is applied from error signal generator 730 by way of a path 731 to a tracking loop 732, preferably a second-order tracking loop, which averages the error signal over a predetermined number of bits, to produce the desired estimate of bit-to-bit differential phase ($\Delta\phi_i$). The differential phase signal is applied from tracking loop 732 to demodulator 616 by way of signal path 629.

FIG. 8 is a simplified block diagram of a phase compensating DPSK demodulator 616 which may be used in the arrangement of FIG. 6. In FIG. 8, signal $r_{ci}$ is applied over signal path 15a to inputs of multipliers 812 and 838 and to one-bit delay 858, and signal $r_{si}$ is applied over signal path 15b to inputs of multipliers 818 and 832, and to one-bit delay 860. The differential phase estimate information $\Delta\phi_i$ from differential phase tracker 610 of FIG. 7 is applied over signal path 629 to a memory 850, which may simply be a ROM preprogrammed with numbers representing the sine and cosine of address values $\Delta\phi_i$. Memory 850 responds to addressing by the differential phase information, and produces $\sin\Delta\phi_i$, which is applied to inputs of multipliers 818 and 838, and also produces $\cos\Delta\phi_i$, which is applied to inputs of multipliers 812 and 832. Multipliers 812, 818, 832, and 838 perform their multiplications, and produce multiplied signals. The multiplied signals from multipliers 812 and 818 are applied to noninverting input ports of a summing circuit 852, which produces signal $R_{ci}$ on signal path 17a, and the multiplied signals from multipliers 832 and 838 are applied to noninverting and inverting input ports, respectively, of a summing circuit 854, which produces signal $R_{si}$ on signal path 17b:

$$R_{ci} = r_{ci}\cos\Delta\phi_i + r_{si}\sin\Delta\phi_i \quad (14)$$

$$R_{si} = r_{si}\cos\Delta\phi_i - r_{ci}\sin\Delta\phi_i \quad (15)$$

Signal $R_{ci}$ and the output signal $r_{c,(i-1)}$ of delay 858 are applied to multiplier 862 to generate the product $R_{ci}r_{c,i-1}$. Similarly, signal $R_{si}$ and the output signal $r_{s,(i-1)}$ of delay 860 are applied to multiplier 864 to generate the product $R_{si}r_{s,i-1}$. The products $R_{ci}r_{c,i-1}$ and $R_{si}r_{s,i-1}$ are applied to a summing ($\Sigma$) circuit 856, which sums to produce the demodulated signal $$Z_i = r_{c,i-1}R_{ci} + r_{s,i-1}R_{si} \quad (16)$$

on output signal path 17, which may be applied to the FEC decoder, if FEC coding is used.

According to another aspect of the invention, the differential phase signal produced by differential phase tracker 612 of FIG. 6 may be considered to be a sensitive indicator of the residual Doppler frequency error between actual received frequency $f_r$ and frequency estimate $f_{re}$. The differential phase signal is applied, according to this aspect of the invention, over a signal path 660, illustrated in phantom in FIG. 6, to an error converter/combiner block 662, also illustrated in phantom. As illustrated in FIG. 6, block 662, if used, receives the differential phase signal from signal path 660, and also receives the frequency error signal from processor 26 over signal path 27. FIG. 9 is a simplified block diagram illustrating details of block 662 of FIG. 6. In FIG. 9, differential phase signal $\Delta\phi_i$ from signal path 660 is applied to a block 910, which represents the conversion of phase information to frequency information, so that it may be combined with the frequency error signal, designated as $e_f$, arriving over signal path 27 from block 26 of FIG. 6. Block 910 generates a frequency error estimate $e_p$ according to $$e_p = \frac{\Delta\phi_i}{2\pi T} \quad (17)$$

Once the conversion is performed in block 910, the signals may simply be combined, with a weighting if desired. A preferred combining is $$e = \begin{cases} \frac{1}{(1+w)}e_f + \frac{w}{1+w}e_p & \text{if } \Delta\phi < \lambda_f \\ e_f & \text{otherwise} \end{cases} \quad (18)$$

where $w$ is a weighting factor and $\lambda_f$ is a limiting threshold. Note that if $w=1$, then $e_f$ and $e_p$ have equal weight. If $w<1$, $e_f$ is weighted more than $e_p$.

Figure 10:
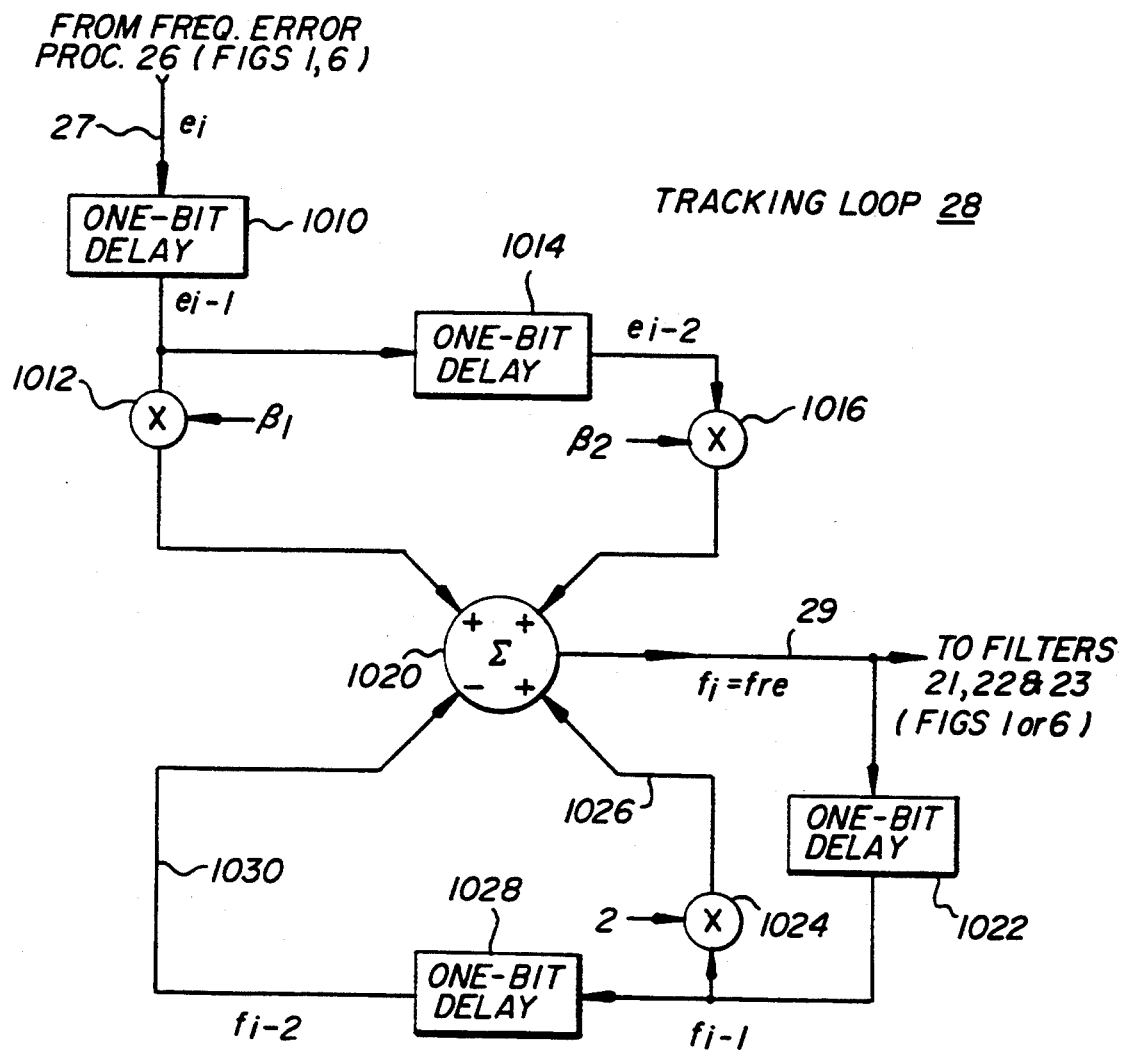
FIG. 10 is a simplified block diagram of a second-order tracking loop which may be used in the arrangements of FIGS. 1 and 6.

FIG. 10 is a simplified block diagram of a second-order tracking loop which may be used as block 28 in the arrangements of FIGS. 1 and 6. The difference equation defining the second-order loop is $$f_i = 2f_{i-1} - f_{i-2} + \beta_1 e_{i-1} + \beta_2 e_{i-2} \quad (19)$$

where $\beta_1$ and $\beta_2$ are loop parameters, which can be expressed in terms of a third loop parameter $\beta$:

$$\beta_1 = 2(1 - e^{-\beta}\cos\beta) \quad (20)$$

$$\beta_2 = e^{-2\beta} - 1 \quad (21)$$

The loop noise bandwidth is $$B_L = \frac{3}{2}\beta; \beta < 1 \quad (22)$$

and the number of bits over which the frequency estimate is averaged is $$N_{AVG} = \frac{2}{3\beta}; \beta < 1 \quad (23)$$

The loop parameter, which is completely specified in terms of $N_{AVG}$, is selected to minimize tracking error. In FIG. 10, the current error signal $e_i$ is applied from processor 26 of FIG. 1 or 6, by way of signal path 27, to a one-bit delay 1010, which delays the signal to produce $e_{i-1}$, as required for equation 19. The one-bit delayed error signal is applied from delay 1010 to the inputs of a multiplier 1012 and of a further one-bit delay 1014. The two-bit delayed signal $e_{i-2}$ from delay 1014 is applied to the input of a second multiplier 1016. Multiplier 1012 multiplies $e_{i-1}$ by $\beta_1$, and multiplier 1016 multiplies $e_{i-2}$ by $\beta_2$, to form the last two terms of equation 19. The outputs of multipliers 1012 and 1016 are applied to noninverting input ports of a summing circuit 1020, for producing a portion of the desired current frequency signal $f_i$ on signal path 29. The output signal of summing circuit 1020 on path 29 is also applied to a one-bit delay 1022, which delays $f_i$ by one bit to produce $f_{i-1}$. Signal $f_{i-1}$ from delay 1022 is applied in common to an input port of a multiplier 1024, and to a one-bit delay 1028. Multiplier 1024 multiplies signal $f_{i-1}$ by two, to form the first term of equation 19, and applies it by way of a path 1026 to a noninverting input port of summing circuit 1020. Delay 1028 delays $f_{i-1}$ by one bit to form $f_{i-2}$, and applies it by way of a path 1030 to an inverting input port of summing circuit 1020. Output signal $f_i$ of summing circuit 1020 corresponds to the current frequency estimate $f_{re}$, averaged over three bits.

Figure 11:
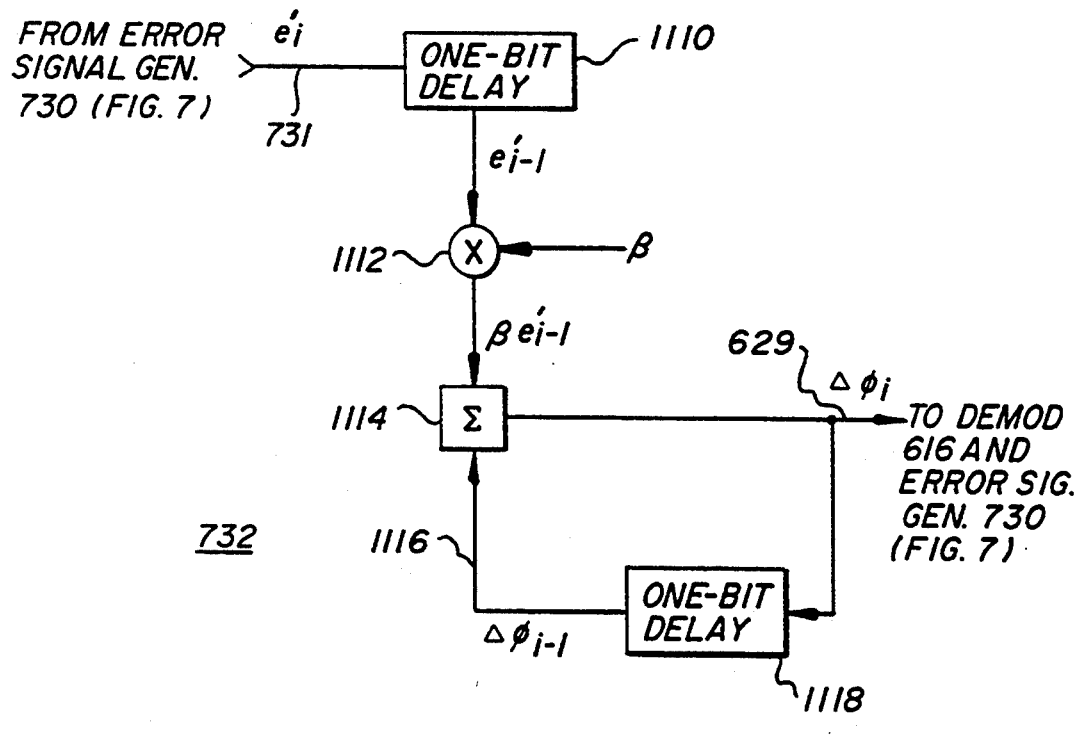
FIG. 11 is a simplified block diagram of a first-order tracking loop which may be used in the arrangement of FIG. 7.

FIG. 11 is a simplified block diagram of a first-order tracking loop which may be used in block 732 of the arrangement of FIG. 7. The difference equation implemented by the first-order loop is $$\Delta\phi_i = \Delta\phi_{i-1} + \beta e_{i-1} \quad (24)$$

where $\beta$ is a loop parameter. It can be shown that the noise bandwidth of the loop is $$B_L = \frac{\beta}{2-\beta} \quad (25)$$

Therefore, the number of bits over which the frequency estimate is averaged is $$N_{AVG} = \frac{2-\beta}{\beta} \quad (26)$$

In FIG. 11, signal e'hd i, which represents the limited error signals generated by error signal generator 730 of FIG. 7, is applied by way of signal path 731 to a one-bit delay, represented as a block 1110 in FIG. 11. Delay 1110 delays the limited error signals by one bit interval, to produce delayed error signals $e'_{i-1}$, which are applied to a multiplier 1112. Multiplier 1112 multiplies the delayed error signals by constant $\beta$, to produce a product signal $\beta e'_{i-1}$, which is the second term of equation 24. A summing circuit 1114 adds delayed phase difference signals $\Delta\phi_{i-1}$, received over signal path 1116, to the delayed error signals $e'_{i-1}$, to produce the desired bit-to-bit phase tracking signals $\Delta\phi_i$ which are applied to the demodulator of FIG. 6 over signal path 629. A further delay circuit 1118 delays the bit-to-bit phase tracking signals $\Delta\phi_i \Delta\phi_i$ produced at the output of summing circuit 1114 by one bit interval, to produce the delayed phase difference signals $\Delta\phi_{i-1}$, the first terms of equation 24, for application by path 1116 to summing circuit 1114.

Computer simulations have shown that a first-order loop implementation for block 732 of FIG. 7 has about the same performance as a second-order loop implementation. For simplicity and ease of implementation, a first-order loop is preferred. For block 28, however, a second-order loop has been found, by computer simulation, to outperform a first-order loop. Hence, a second-order loop is preferred for block 28. Higher-order tracking loops may also be used at the expense of increased complexity.

Figure 12:
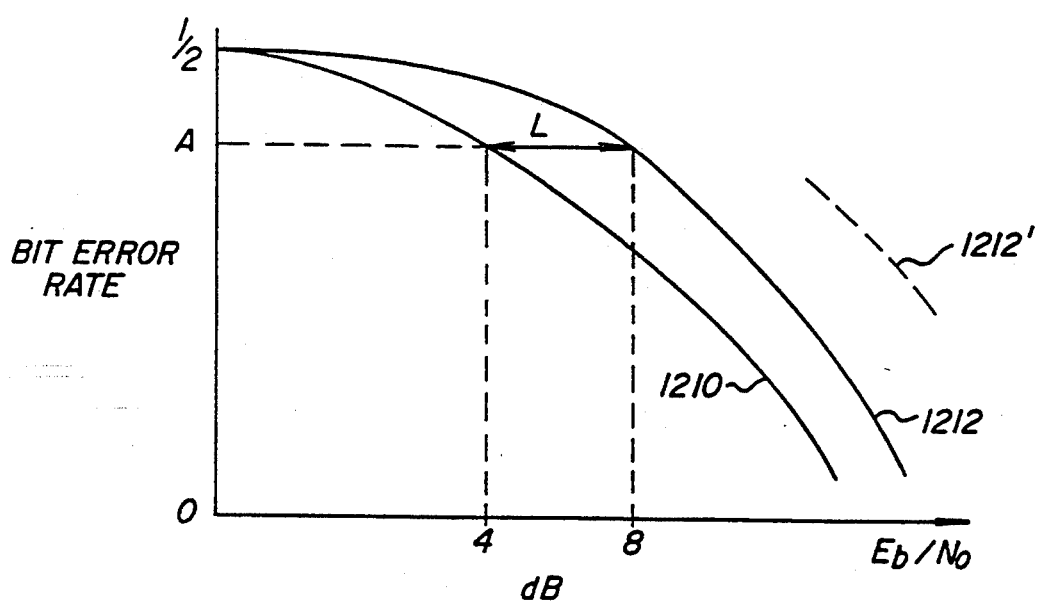
FIG. 12 plots bit error rate against signal-to-noise ratio.

FIG. 12 plots theoretical uncoded bit error rate (BER) versus signal-to-noise ratio (SNR) of $E_b/N_o$. In FIG. 12, plot 1210 corresponds to a plot of $$BER = 1/2e^{-\frac{E_b}{2N_o}} \quad (27)$$

which applies to the case of perfect knowledge of the received frequency, such as might be the case with a hard-wired system, for example. Plot 1212 corresponds to the situation which might occur due to imperfect frequency tracking. Clearly, depending upon the degree of tracking imperfection, there may be a family of curves such as curve 1212 extending to the left from curve 1210, as suggested by dashed curve 1212', representing a greater tracking imperfection. At a given signal-to-noise ratio, such as eight dB, the BER is lower for plot 1210, representing perfect frequency knowledge, than for plot 1212, representing a tracking error. Thus, the effect of imperfect tracking may be represented as the equivalent amount of signal-to-noise degradation. For example, the measured BER might be A from plot 1212 in FIG. 12, with an eight dB SNR, thereby indicating that the error or "demodulation loss" due to the frequency mistracking is L, or four dB. Computer simulation shows that, for a data rate of 75 bits per second and rate ½ FEC coding, application of the phase tracking signal $\Delta\Phi_i$ of FIG. 7 to the demodulator of FIG. 8 reduces the demodulation loss (improves the performance) by 0.11 dB at a 4 dB SNR, and by 0.74 dB at 8 dB SNR. The improvement of 0.74 dB in SNR corresponds to an order-of-magnitude improvement in the coded BER. Application of the phase tracking signal $\Delta\Phi_i$ of FIG. 7 to both the demodulator of FIG. 8 and to frequency tracker 20 results in a demodulation loss improvement of 0.95 dB at eight dB SNR, but degrades the performance by almost twelve dB at four dB SNR. Thus, it appears that application of $\Delta\Phi_i$ to the demodulator improves the performance, especially at moderate SNR such as eight dB, and application of $\Delta\Phi_i$ to the frequency tracker improves the performance at moderate SNR, but degrades it markedly for very noisy signals.

Other embodiments of the invention will be apparent to those skilled in the art. For example, signals or data may be in serial or parallel format, and the corresponding signal or data paths may include single or multiple paths, as appropriate. If the receiver includes a measurement of SNR, it may be used to gate signal $\Delta\Phi_i$ from differential phase tracker 612 of FIG. 6 to frequency tracker 20 only when the SNR is above a threshold value.

What is claimed is:

1. A data receiver for receiving phase shift keyed data carrier signals, subject to frequency variation about a nominal carrier frequency ($f_r$), said receiver comprising:
   demodulation means including a signal input port and a phase tracking signal input port, for demodulating phase-shift keyed modulation on filtered data carrier signals applied to said signal input port, with the aid of a phase tracking signal applied to said phase tracking signal input port, to thereby produce demodulated signals;

controllable bandpass filter means including an input port coupled for receiving said data carrier signals, an output port at which bandpass filtered data carrier signals are generated, and also including an estimated frequency signal input port for controlling the frequency of said bandpass filter means, said output port of said filter means being coupled to said input port of said demodulation means, for filtering said data carrier signals at a frequency ($f_{re}$) equal to an estimate of said carrier frequency, in response to said estimated frequency signals, to thereby generate said filtered data carrier and to apply said filtered data carrier to said input port of said demodulation means;

signal frequency estimating means coupled for receiving said data carrier signals, for generating said estimated frequency signals, representing an estimate ($f_{re}$) of the frequency of said data carrier; and differential phase tracking means coupled to said controllable bandpass filter means for receiving said filtered data carrier signals therefrom, and for determining the bit-to-bit phase difference of said filtered data carrier, for generating said phase tracking signals ($\Delta\phi_i$).

2. A data receiver according to claim 1, wherein:

said filtered data carrier signals comprise in-phase ($r_{ci}$) and quadrature ($r_{si}$) components; and said demodulation means comprises:

(a) sine and cosine generating means coupled to said phase tracking means for generating sine (sin $\Delta\phi_i$) and cosine (cos $\Delta\phi_i$) signals representative of the sine and cosine of the bit-to-bit phase represented by said phase tracking signals;

(b) first multiplying means coupled to receive said inphase component of said filtered data carrier signals, and coupled to said sine and cosine generating means, for multiplying said inphase component by said cosine signals, for producing first product signals;

(c) second multiplying means coupled to receive said quadrature component of said filtered data carrier signals, and coupled to said sine and cosine generating means, for multiplying said quadrature component of said filtered data carrier signals by said sine signals, for producing second product signals;

(d) third multiplying means coupled to receive said quadrature component of said filtered data carrier signals, and coupled to said sine and cosine generating means, for multiplying said quadrature component of said filtered data carrier signals by said cosine signals, for producing third product signals;

(e) fourth multiplying means coupled to receive said inphase component of said filtered data carrier signals, and coupled to said sine and cosine generating means, for multiplying said inphase component of said filtered data carrier signals by said sine signals, for producing fourth product signals;

(f) first summing means coupled to said first and second multiplying means, for summing together said first and second product signals, for producing summed current cosine signals ($R_{ci}$);

(g) second summing means coupled to said third and fourth multiplying means, for taking the difference between said third and fourth product signals, for producing summed current sine signals ($R_{si}$);

(h) delay means coupled for receiving said inphase and quadrature components of said filtered data carrier signals, for delaying said inphase and quadrature components for a period equal to an integer multiple of the duration of one bit of said data, for thereby generating delayed inphase ($r_{c,i-1}$) and quadrature ($r_{x,i-1}$) components of said filtered data carrier signals;

(i) fifth multiplying means coupled to said first summing means and to said delay means, for multiplying said summed current cosine signals by said delayed inphase component of said filtered data carrier signals, for thereby generating fifth product signals;

(j) sixth multiplying means coupled to said second summing means and to said delay means, for multiplying said summed current sine signals by said delayed quadrature component of said filtered data carrier signals, for thereby generating sixth product signals;

(k) third summing means coupled to said fifth and sixth multiplying means, for summing said fifth and sixth product signals together for generating said demodulated signals.

3. A receiver according to claim 2, wherein said delay means delays each of said inphase and quadrature components of said filtered data carrier signals for a period equal to the duration of one bit of said data.

4. A receiver according to claim 1, wherein:

said filtered data carrier signals comprise in-phase ($r_{ci}$) and quadrature ($r_{si}$) components; and said differential phase tracking means comprises:

(a) delay means coupled for receiving said inphase and quadrature components of said filtered data carrier signals, for delaying said inphase and quadrature components of said filtered data carrier signals for a period equal to an integer multiple of the duration of one bit of said data, for thereby generating delayed inphase ($r_{c,i-1}$) and quadrature ($r_{s,i-1}$) components of said filtered data carrier signals;

first multiplying means coupled to said delay means and also coupled for receiving said inphase component of said filtered data carrier signals, for multiplying said inphase component of said filtered data carrier signals by said delayed inphase component of said filtered data carrier signals, to thereby generate first product signals;

second multiplying means coupled to said delay means and also coupled for receiving said inphase component of said filtered data carrier signals, for multiplying said inphase component of said filtered data carrier signals by said delayed quadrature component of said filtered data carrier signals, to thereby generate second product signals;

third multiplying means coupled to said delay means and also coupled for receiving said quadrature component of said filtered data carrier signals, for multiplying said quadrature component of said filtered data carrier signals by said delayed inphase component of said filtered data carrier signals, to thereby generate third product signals;

fourth multiplying means coupled to said delay means and also coupled for receiving said quadrature component of said filtered data carrier signals, for multiplying said quadrature component of said filtered data carrier signals by said delayed quadrature component of said filtered data carrier signals, to thereby generate fourth product signals;

first summing means coupled to said first multiplying means and to said fourth multiplying means, for summing together said first and fourth product signals, to thereby generate first summed signals ($z_i$);

second summing means coupled to said second multiplying means and to said third multiplying means, for taking the difference between said second and third product signals, to thereby generate second summed signals ($x_i$); and arctangent processing means coupled to said first and second summing means, for generating, from the ratio of said first and second summed signals, unaveraged phase tracking signals ($\Delta\Psi_i$) representing the bit-to-bit phase difference of said filtered data carrier.

5. A data receiver according to claim 4, wherein said delay means delays said inphase ($r_{ci}$) and quadrature ($r_{si}$) components of said filtered data carrier signals for a period equal to the duration of one bit of said data, for thereby generating said delayed inphase ($r_{c,i-1}$) and quadrature ($r_{s,i-1}$) components of said filtered data carrier signals.

6. A data receiver according to claim 5, further comprising:

error signal generating means coupled to said arctangent processing means for receiving therefrom said unaveraged phase tracking signals representing the bit-to-bit phase difference of said filtered data carrier ($\Delta\Psi_i$), and for subtracting from said unaveraged phase tracking signals an averaged value of said phase tracking signal ($\Delta\phi_i$), to thereby generate phase tracking error signals ($e'_i$); and a tracking loop coupled to said error signal generating means for averaging said unaveraged phase tracking signals representing the bit-to-bit phase difference of said filtered data carrier signals over a plurality of bit intervals of said data, to form averaged phase tracking signals ($\Delta\phi_i$) for application to said error signal generating means and said demodulation means.

7. A data receiver according to claim 6, wherein said tracking loop comprises:

first tracking loop delay means for delaying said phase tracking error signals ($e'_i$) by an integer multiple of the duration of one bit of said data, for thereby generating delayed phase tracking error signals;

fifth multiplying means coupled to said first tracking loop delay means, for multiplying said delayed phase tracking error signals by a constant ($\beta$), for thereby generating fifth product signals;

third summing means coupled to said fifth multiplying means, for summing said fifth product signals with delayed averaged phase tracking signals ($\Delta\phi_{i-1}$), for thereby generating said averaged phase tracking signals ($\Delta\phi_i$); and second tracking loop delay means coupled to said third summing means, for delaying said averaged phase tracking signals ($\Delta\phi_i$) by an integer multiple of the duration of one bit of said data carrier, for thereby generating said delayed averaged phase tracking signals.

8. A data receiver according to claim 7, wherein said first and second tracking loop delay means each delays the signals passing therethrough by the duration of one bit of said data carrier.

9. A data receiver according to claim 1, wherein said signal frequency estimating means comprises:

first offset bandpass filter means for filtering said data carrier signals, said first offset bandpass filter means being tuned to a frequency ($f_{re}+F/2$) above said estimate of said data carrier frequency by an offset frequency dependent upon the instantaneous data rate of said carrier signals, for producing first filter output signals ($R_p$);

second offset bandpass filter means for filtering said data carrier signals, said second offset bandpass filter means being tuned to a frequency ($f_{re}-F/2$) below said estimate of said data carrier frequency by said offset frequency, for producing second filter output signals ($R_m$); and processing means coupled to said first and second offset bandpass filter means for generating said frequency estimate signal in response to the relative amplitudes of said first and second filter output signals.

10. A data receiver according to claim 9, further comprising frequency tracking means coupled to said processing means for averaging the value of said frequency estimate signals over a plurality of bit periods of said data.

11. A data receiver according to claim 10, wherein said frequency tracking means comprises:

first delay means coupled to receive said frequency estimate signals ($e_i$) from said processing means, for delaying said frequency estimate signals by an integer multiple of the duration of one bit of said data, to thereby form first delayed frequency estimate signals ($e_{i-1}$);

first multiplying means coupled to said first delay means, for multiplying said first delayed frequency estimate signals by a first constant ($\beta_1$), to thereby form first product signals;

second delay means coupled to said first delay means, for delaying said first delayed signals by an integer multiple of said duration of one bit of said data, to thereby generate second delayed signals;

second multiplying means coupled to said second delay means, for multiplying said second delayed signals by a second constant ($\beta_2$), to thereby generate second product signals;

summing means coupled to said first and second multiplying means, for summing together said first and second product signals with third product signals and the negative of fourth delayed signals to generate said frequency estimate signals averaged over an integer number of said durations of said bits of said data;

third delay means coupled to said summing means, for delaying said frequency estimate signals, as averaged at the output of said summing means, for the duration of an integer number of said bits of said data, to thereby form third delayed signals;

third multiplying means coupled to said third delay means and to said summing means, for multiplying said third delayed signals by two, for generating and applying to said summing means said third product signals; and fourth delay means coupled to said third delay means and to said summing means, for delaying said third delayed signals by the duration of an integer number of said bits of said data, for generating and applying to said summing means said fourth delayed signals.

12. A data receiver according to claim 1, further comprising error converting and combining means coupled to said signal frequency estimating means and to said differential phase tracking means, for converting said phase tracking signals ($\Delta\phi_i$) into a frequency-representative error signal form ($e_p$), and for combining said frequency-representative error signal form of said phase tracking signals with frequency error signals ($e_f$) to aid in generating said estimated frequency signals.

13. A data receiver according to claim 1, wherein said filtered data carrier signals comprise in-phase ($r_{ci}$) and quadrature ($r_{si}$) components;

said demodulation means comprises:
(a) sine and cosine generating means coupled to said phase tracking means for generating sine ($\sin \Delta\phi_i$) and cosine ($\cos \Delta\phi_i$) signals representative of the sine and cosine of the bit to-bit phase represented by said phase tracking signals;
(b) first multiplying means coupled to receive said inphase component of said filtered data carrier signals, and coupled to said sine and cosine generating means, for multiplying said inphase component by said cosine signals, for producing first product signals;
(c) second multiplying means coupled to receive said quadrature component of said filtered data carrier signals, and coupled to said sine and cosine generating means, for multiplying said quadrature component of said filtered data carrier signals by said sine signal, for producing second product signals;
(d) third multiplying means coupled to receive said quadrature component of said filtered data carrier signals, and coupled to said sine and cosine generating means, for multiplying said quadrature component of said filtered data carrier signals by said cosine signal, for producing third product signals;
(e) fourth multiplying means coupled to receive said inphase component of said filtered data carrier signals, and coupled to said sine and cosine generating means, for multiplying said inphase component of said filtered data carrier signals by said sine signals, for producing fourth product signals;
(f) first summing means coupled to said first and second multiplying means, for summing together said first and second product signals, for producing summed current cosine signals ($R_{ci}$);
(g) second summing means coupled to said third and fourth multiplying means, for taking the difference between said third and fourth product signals, for producing summed current sine signals ($R_{si}$);
(h) first delay means coupled for receiving said inphase and quadrature components of said filtered data carrier signals, for delaying said inphase and quadrature components for a period equal to an integer multiple of the duration of one bit of said data, for thereby generating delayed inphase ($r_{c,i-1}$) and quadrature ($r_{s,i-1}$) components of said filtered data carrier signals;
(i) fifth multiplying means coupled to said first summing means and to said first delay means, for multiplying said summed current cosine signals by said delayed inphase component of said filtered data carrier signals, for thereby generating fifth product signals;
(j) sixth multiplying means coupled to said second summing means and to said first delay means, for multiplying said summed current sine signals by said delayed quadrature component of said filtered data carrier signals, for thereby generating sixth product signals;
(k) third summing means coupled to said fifth and sixth multiplying means, for summing said fifth and sixth product signals together, for generating said demodulated signals;

and said differential phase tracking means comprises:
(l) seventh multiplying means coupled for receiving said inphase component of said filtered data carrier signals and said delayed inphase component of said filtered data carrier signals, for multiplying said inphase component of said filtered data carrier signals by said delayed inphase component of said filtered data carrier signals, to thereby generate seventh product signals;
(m) eighth multiplying means coupled for receiving said inphase component of said filtered data carrier signals and said delayed quadrature component of said filtered data carrier signals, for multiplying said inphase component of said filtered data carrier signals by said delayed quadrature component of said filtered data carrier signals, to thereby generate eighth product signals;
(n) ninth multiplying means coupled for receiving said quadrature component of said filtered data carrier signals and said delayed inphase component of said filtered data carrier signals, for multiplying said quadrature component of said filtered data carrier signals by said delayed inphase component of said filtered data carrier signals, to thereby generate ninth product signals;
(o) tenth multiplying means coupled for receiving said quadrature component of said filtered data carrier signals and said delayed quadrature component of said filtered data carrier signals, for multiplying said quadrature component of said filtered data carrier signals by said delayed quadrature component of said filtered data carrier signals, to thereby generate tenth product signals;
fourth summing means coupled to said seventh multiplying means and to said tenth multiplying means, for summing together said seventh and tenth product signals, to thereby generate fourth summed signals ($z_i$);
fifth summing means coupled to said eighth multiplying means and to said ninth multiplying means, for taking the difference between said eighth and ninth product signals, to thereby generate fifth summed signals ($x_i$); and
arctangent processing means coupled to said fourth and fifth summing means, for determining a phase represented by the ratio of said fourth and fifth summed signals, to thereby generate said phase tracking signal ($\Delta\phi_i$) representing the bit-to-bit phase difference of said filtered data carrier signals.

14. A data receiver according to claim 13, further comprising:
error signal generating means coupled to said arctangent processing means for receiving said phase tracking signals therefrom representing the bit-to-bit phase difference of said filtered data carrier ($\Delta\Psi_i$), and for subtracting from said phase tracking signals an averaged value of said phase tracking signals ($\Delta\phi_i$), to thereby generate phase tracking error signal ($e'_i$); and a tracking loop coupled to said error signal generating means for averaging said phase tracking signals representing the bit-to-bit phase difference of said filtered data carrier over a plurality of bit intervals of said data, to form averaged phase tracking signals ($\Delta\phi_i$) for application to said error signal generating means and said demodulation means.

* * * * *